A. W. LITTLE.
SKINNING IMPLEMENT.
APPLICATION FILED JAN. 28, 1908.

901,016.

Patented Oct. 13, 1908.

WITNESSES
Chas. N. Davies
Myron G. Clear

INVENTOR
Alonzo W. Little,
By C. L. Parker
Attorney

UNITED STATES PATENT OFFICE.

ALONZO W. LITTLE, OF COLESVILLE, NEW JERSEY.

SKINNING IMPLEMENT.

No. 901,016.  Specification of Letters Patent.  Patented Oct. 13, 1908.

Application filed January 28, 1908. Serial No. 413,126.

*To all whom it may concern:*

Be it known that I, ALONZO W. LITTLE, citizen of the United States, residing at Colesville, in the county of Sussex and State of New Jersey, have invented certain new and useful Improvements in Skinning Implements, of which the following is a specification.

My invention relates to skinning implements and more particularly to implements for skinning animals' tails, in such manner that the skin and fur may be withdrawn unbroken and that the cartilage of the tail will remain uninjured.

The object of my invention is to provide a simple, compact and inexpensive device which will take up a minimum of space and which will efficiently serve its purpose.

Figure 1:
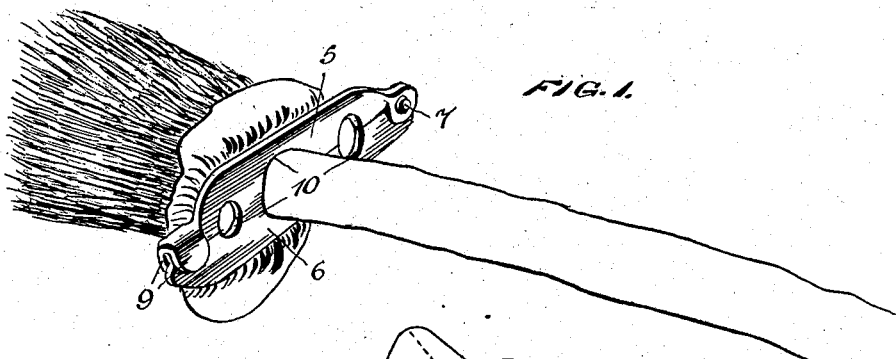
Figure 2:
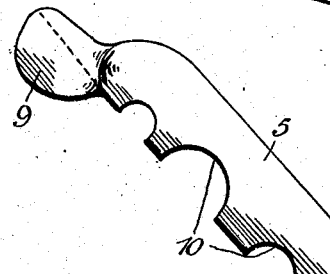
Figure 3:
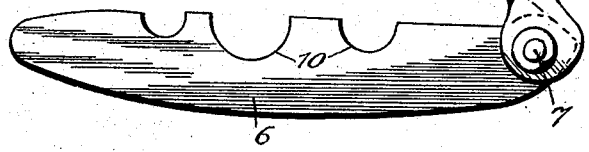
Figure 4:
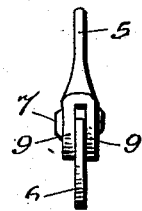

My invention further and specifically resides in the following features of construction, arrangement and operation, to be hereinafter described with reference to the accompanying drawings forming a part of this specification, in which like numerals are used to designate like parts throughout the several figures, and in which Figure 1 is a view illustrating the practical application of my invention. Fig. 2 is a side elevation thereof, in the opened position. Fig. 3 is a similar view in the closed position and Fig. 4 is an end elevation thereof.

In the practical embodiment of my invention, I provide a pair of blades 5 and 6, pivotally connected by a headed pin 7 at their rear ends, said blade 5 being provided upon its forward end with an enlarged bifurcated projection forming spaced ears 9 adapted to embrace the opposing blade 6 when said blades are closed as shown in Fig. 3. The blades 5 and 6 are in the same plane with one another and are provided upon their inner abutting longitudinal edges with a series of alined semicircular recesses 10, adapted to form substantially circular openings, of different sizes, when the said blades are closed, thus providing for the accommodation of different sizes of animals' tails. The blades 5 and 6 while relatively thin, are of the same thickness throughout their body portions, the edges of the recesses 10 being just as thick as the outer longitudinal edges of the blades.

By means of the device just described, I am able to more quickly and more efficiently strip the fur from an animal's tail, and also in a much more sanitary manner than this operation has previously been accomplished.

Having fully described my invention, I claim:

In a skinning implement of the character described, the combination of a pair of blades pivoted at one end and in the same plane to provide abutting edges, one of said blades having an enlarged bifurcated projection at its free end to embrace the opposing blade when closed, and said edges having a plurality of semicircular recesses provided with unsharpened edges extending the entire thickness of said blades and alined between said blades to form substantially circular openings of different sizes when said blades are closed, substantially as described.

In testimony whereof I affix my signature in presence of two witnesses.

ALONZO W. LITTLE.

Witnesses:
WILLIAM S. McCOY,
FLOYD DOTY.